United States Patent Office 3,787,537
Patented Jan. 22, 1974

3,787,537
TRI(ISOPROPYL)PHENYL PHOSPHATES
Michel De Marcq, Lyon, France, assignor to Produits Chimiques Ugine Kuhlmann, Paris, France
No Drawing. Filed Aug. 2, 1971, Ser. No. 168,418
Claims priority, application France, July 5, 1970, 7026375
Int. Cl. C07f 9/08, 9/18
U.S. Cl. 260—954                 10 Claims

ABSTRACT OF THE DISCLOSURE

Hydrolysis stable phosphorous esters are disclosed corresponding to the general formula

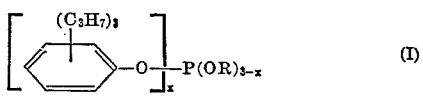
(I)

wherein the group $C_3H_7$ is an isopropyl radical, $x$ is the integer 1,2 or 3 and R is an aryl or alkaryl radical containing from 6 to about 30 carbon atoms or an aliphatic, cycloaliphatic or arylaliphatic radical containing from 2 to about 30 carbon atoms and from 0 to 2 chlorine atoms, 0 or 1 bromine atom and 0 to 6 oxygen atoms. Compositions of matter comprising the phosphorous esters (I) containing less than about 5% by weight of amines having boiling points greater than about 150° C. and processes for preparing the phosphorous esters (I) are also disclosed.

BACKGROUND OF THE INVENTION

(I) Field of the invention

This invention relates to hydrolysis-stable phosphorous esters (phosphites) conforming to Formula I, above, compositions of matter comprising Formula I compounds containing less than 5% by weight of amines having boiling points greater than about 150° C. and processes for preparing the phosphorous esters of Formula I.

(II) Description of the prior art

One of the principal applications of known phosphorous esters resides in the use of these compounds for the stabilization of rubber and certain plastic materials from degradation due to heat, light or oxidation. Among the phosphorous esters currently utilized for this purpose, alone or in combination with other non-phosphorous stabilizers, one may especially cite triphenyl phosphite, the use of which in synthetic rubbers is mentioned in U.S. Pat. 2,419,354, the nonylphenyl phosphites, the addition of which to synthetic rubbers is disclosed in French Pat. 1,063,960, the addition to polyvinylchloride in French Pat. 1,176,735, the addition to polyolefins in French Pats. 1,164,850, 1,294,998 and 1,314,831 and the addition to polyurethanes in French Pat. 1,206,876. One may also cite the phenyl isodecyl phosphites, the use of which as stabilizers for rubbers and polyolefins is mentioned in French Pat. 1,293,668 and the use of which in polyvinylchloride is disclosed in French Pat. 1,175,086. The use of the phosphorous esters of styrenated phenols is disclosed in French Pats. 1,319,836 and 1,388,246.

A common drawback with all of the known phosphorous esters lies in their tendency to undergo hydrolysis. This tendency renders them unsuitable for use as stabilizers for rubber and plastic materials when the phosphite must be added in a stage which involves the presence of water, as for example, before or during the coagulation of a synthetic rubber latex. Even in the case of plastic materials such as polyvinylchloride wherein stabilization is accomplished in the absence of water, the presence of a very hydrolyzable stabilizer such as triphenyl phosphite is undesirable because it can later be the cause of the development of disagreeable phenolic odors or a progressive loss of stability upon aging.

Numerous suggestions have been proposed for solving the problems associated with the use of known phosphorous esters. Attempts have been made to improve the resistance of phosphorous esters to hydrolysis, notably, the triaryl phosphites which are more frequently used because of their economy, by adding a small quantity of a heavy amine, usually triisopropanolamine (French Pat. 1,582,387). The effect of adding the amine is definite because it relies upon the fact that hydrolysis of triaryl or trialkyl phosphites is accelerated by the acidity which the hydrolysis gives rise to in the form of phosphorous acid or monoaryl or alkyl phosphite. However, the stabilization effect is only momentary and ceases when the amine is totally neutralized.

Attempts have also been made to reduce the rate of hydrolysis of aryl phosphites by attaching to each aryl radical one or several heavy substituents. This has been the case with the mono and dinonylphenyl phosphites and the phosphites of the styrenated phenols mentioned above. The improvement is definite by comparison with simple triphenyl phosphite but the disadvantage of such compounds is that they often contain only a low amount of phosphorous.

The heavy trialkyl phosphites represent a nearly ideal solution. They hydrolyze, in fact, much more slowly than the aryl phosphites of same molecular weight, as shown in Table I infra. Unfortunately they cannot be obtained as economically as the aryl phosphites which are prepared by direct reaction of $PCl_3$. On the contrary, the manufacture of the heavy trialkyl phosphites generally requires the manufacture of an intermediate triaryl phosphite prepared by the reaction of $PCl_3$ with a suitable phenol followed by alcoholysis of the resulting phosphite with the selected alcohol.

It has been observed moreover, that the alkyl phosphites, despite their increased resistance to hydrolysis, do not always stabilize polymers as effectively as the substituted aryl phosphites. The tricoordinated phosphorous atom is not in fact the only element to be considered in the stabilization mechanism of polymers by phosphorous esters.

SUMMARY OF THE INVENTION

It has been surprisingly discovered that phosphorous esters corresponding to the general formula

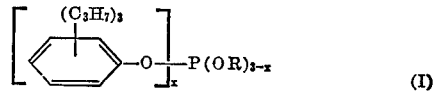
(I)

wherein the group $C_3H_7$ is in isopropyl radical, $x$ is the integer 1, 2 or 3 and R is an aryl or alkaryl radical containing from 6 to about 30 carbon atoms or an aliphatic, cycloaliphatic or arylaliphatic radical containing from 2 to about 30 carbon atoms and from 0 to 2 chlorine atoms, 0 or 1 bromine atom and 0 to 6 oxygen atoms, overcome the disadvantages of the above-described known phosphites.

Most of the phosphorous esters of this invention hydrolyze at a significantly slower rate than mono (dinonylphenyl) bis (monononylphenyl) phosphite (known commercially as Polygard) which is well known for its stability to hydrolysis while posessing a much higher amount of phosphorous than the latter compound.

The phosphites of this invention can moreover contain less than about 5% by weight of a heavy amine having a boiling point above 150° C. thereby further increasing their stability to hydrolysis.

Several processes for preparing the hydrolysis-stable phosphorous esters of this invention can be utilized.

$PCl_3$ can be reacted with the phenol $(C_3H_7)_3C_6H_2OH$ alone or together or subsequently with a different phenol R'OH wherein R' is an aryl or alkaryl radical of from 6 to about 30 carbon atoms with a molar ratio of phenol or combined phenols to $PCl_3$ of from 3:1 to about 6:1 at a temperature of from 0 to about 300° C. to yield a Formula I compound wherein R is an aryl or alkaryl radical of from 6 to about 30 carbon atoms.

Or an aryl phosphite or an aryl triisopropylphenyl phosphite can be transesterified with an alcohol or phenol ROH wherein R has the same meaning as in Formula I, in the presence of a catalyst thereby selectively displacing the aryl radical in the form of a phenol ArOH in which Ar represents the aryl radical.

Moreover, triisopropylphenol can be reacted with $PCl_3$ yielding a triisopropylphenyl chlorophosphite or mixture of triisopropylphenyl chlorophosphites corresponding to the general formula

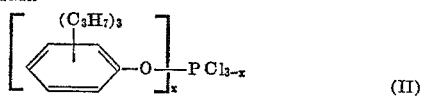

wherein the group $C_3H_7$ is an isopropyl radical, $x$ is the integer 1, 2 or 3 and the Formula II compound reacted with an epoxide

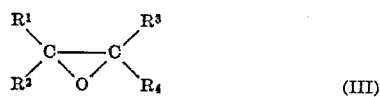

wherein $R^1$, $R^2$, $R^3$ and $R^4$ each represent a hydrogen atom, an aliphatic, cycloaliphatic or aromatic radical, $R^1$ and $R^2$ and/or $R^2$ and $R^4$ together form a cycloaliphatic or aryl radical, the total number of carbon atoms in Formula III not exceeding 30 and there can be present in Formula III up to 1 atom of chlorine or bromine and up to 6 atoms of oxygen in addition to the epoxidic oxygen.

DETAILED DESCRIPTION OF THE INVENTION

This invention relates to hydrolysis-stable phosphorous esters corresponding to the general formula

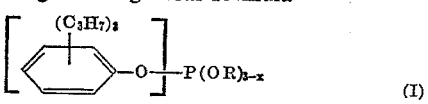

wherein the group $(C_3H_7)$ is an isopropyl radical, $x$ is the integer 1, 2 or 3 and R is an aryl or alkaryl radical containing from 6 to about 30 carbon atoms or an aliphatic, cycloaliphatic or aryl-aliphatic radical containing from 2 to about 30 carbon atoms and from 0 to 2 chlorine atoms, 0 or 1 bromine atom or 0 to 6 oxygen atoms.

This invention also relates to compositions of matter comprising hydrolysis-stable phosphorous esters corresponding to Formula I containing less than about 5% by weight of amines having boiling points greater than about 150° C.

Examples of phosphites useful according to this invention in which the symbol R designates an aryl or alkaryl group include such groups as the following: phenyl, cresyl, xylyl, isopropylphenyl, isopropylcresyl, di-isopropylphenyl, isopropylxylyl, diisopropylcresyl, triisopropylphenyl, tetraisopropylphenyl, tertiobutylphenyl, ditertiobutylphenyl, tertiobutylcresyl, octylphenyl, nonylphenyl, dinonylphenyl, trinonylphenyl, dodecylphenyl, α or β naphthyl, α methylbenzylphenyl. R can also be a monovalent residue of a polyphenol such as resorcinol, hydroquinone, 1,5-naphthalene diol, bisphenol A, ditertiobutyl bisphenol A, and p,p'diphenol.

Examples of phosphites useful according to this invention in which R designates an aliphatic, cycloaliphatic or arylaliphatic group which can be chlorinated, brominated or oxygenated include such groups as the following: isooctyl, isodecyl, isotridecyl, stearyl, benzyl, methyl tri (oxyethyl), methyl tri (oxypropyl), 1-ethyl-2-chloro, 1-propyl - 2 - chloro, 2-propyl - 1 - chloro, 1,3-dichloro-2-propyl, 2,3 - dichloro - 1 - propyl, 2-butyl-3-chloro, 2-chlorocyclohexyl, 2 - chloro - 2 - phenylethyl. R can also represent a monovalent residue of a polyalcohol such as ethyleneglycol, diethyleneglycol, triethyleneglycol, 1,3-propane diol and 1,4-butanediol.

Examples of heavy amines useful according to this invention which may be added to the phosphorous esters conforming to the Formula I to increase their resistance to hydrolysis include such amines as triethanolamine, triisopropanolamine, diethanolamine, diisopropanolamine, tetraisopropanolethylenediamine, aniline, alpha naphthylamine, and o- m- or p-phenylenediamine.

The hydrolysis-stable phosphorous esters of Formula I can be obtained by the processes hereinbelow described. When the radical R of Formula I designates an aryl or alkylaryl radical of from 6 to about 30 carbon atoms, an advantageous method for preparing the phosphorous esters of this invention comprises reacting at a temperature between 0 and about 300° C., $PCl_3$ with the phenol $(C_3H_7)_3C_6H_2OH$ alone or together or subsequently with a different phenol R'OH wherein R' is an aryl or alkaryl radical of from 6 to about 30 carbon atoms with the ratio of phenol or combined phenols to $PCl_3$ being between 3:1 and about 6:1 and advantageously, between 3.3:1 and about 4.5:1. An excess of the one or both phenols can be recovered by distillation under vacuum at the end of the reaction.

When the phenol R'OH presents a steric hindrance less than that of triisopropylphenol, which is the more frequent case, it is advantageous to react R'OH last, after the reaction of $PCl_3$ with triisopropylphenol has practically ceased. In this way, the completion of the reaction can be more quickly attained. It is noted that obtaining a pure phosphite of tris (triisopropylphenyl) requires a prolonged period of heating at an elevated temperature due to the considerable steric hindrance of such a molecule. A judicious choice in the selection of the radical R' permits on the other hand, the preparation of phosphorous esters within a reasonable time at the same time imparting to the phosphite, a sufficient resistance to hydrolysis.

A method for preparing the phosphorous esters of this invention which is advantageously employed whenever the phenol or alcohol ROH possesses a boiling point higher than about 150° C. at atmospheric pressure comprises transesterifying an aryl phosphite or an aryl triisopropyl phenyl phosphite with the alcohol or phenol ROH in the presence of a catalyst thereby selectively displacing the aryl radical in the form of the phenol ArOH wherein Ar is an aryl radical. The catalyst for this reaction is advantageously a base such as sodium hydroxide, potassium hydroxide, sodium amide, sodium borohydride, sodium methylate, sodium phenate, calcium oxide, zinc oxide, pentamethylguanidine, guanidine carbonate, diethanolamine, and triethanolamine. The amount of catalyst employed can be in the range of 0.01 to 5.0% by weight of the reaction medium and advantageously between 0.03 to 1.0% by weight.

The radical Ar is advantageously selected from the radicals corresponding to ArOH having boiling points below or only slightly higher than that of triisopropylphenol and that of the phenol or alcohol ROH so that transesterification can be carried to completion while eliminating the phenol ArOH by distillation under vacuum at a rate proportionate to its formation without at the same time eliminating substantial amounts of triisopropylphenol or ROH. Alcoholysis can be carried out between 120° and 200° C.

When the radical R of Formula I designates an aliphatic, cycloaliphatic or aryl-aliphatic radical substituted in the 2-position (counting from the oxygen atom which is bonded to phosphorous) with a chlorine atom, a third method for preparing the phosphorous esters of this invention can be employed. This method comprises reacting in a first step, triisopropylphenol with PCl₃ thereby obtaining a chlorophosphite or a mixture of chlorophosphites of triisopropylphenol conforming to Formula II

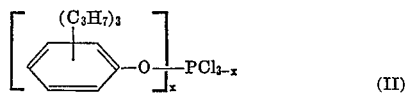
(II)

wherein $x$ had the same meaning as in Formula I, and in a second step, reacting Compound II with an epoxy compound conforming to Formula III

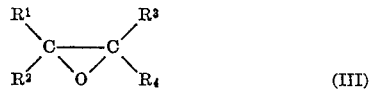
(III)

wherein $R^1$, $R^2$, $R^3$ and $R^4$, each represent a hydrogen atom, an aliphatic, cycloaliphatic or aromatic radical, $R^1$ and $R^2$ and/or $R^3$ and $R^4$ together form a cycloaliphatic or aryl radical, the total number of carbon atoms in Formula III not exceeding 30 and there can be present in Formula III up to 1 atom of chlorine or bromine and up to 6 atoms of oxygen in addition to the epoxidic oxygen.

The reaction taking place in step two can be represented as follows

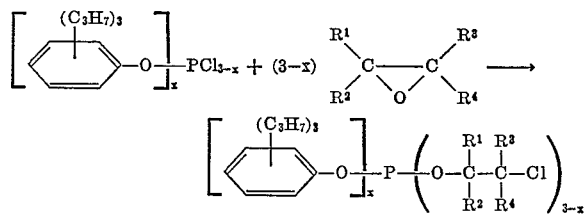

Examples of epoxidic compounds which can be advantageously employed according to this invention include ethylene oxide, propylene oxide, 1,2-butylene oxide, cyclohexene oxide, styrene oxide, epichlorohydrin, epibromohydrin, glycidol, the ethers and esters of glycidol, the esters of glycidic acid, epoxidized butyl oleate and epoxidized soybean oil.

The first reaction, i.e., the reaction between triisopropylphenol and PCl₃, is advantageously carried out at a temperature of from 0 to about 100° C. and can have a duration of from 1 hour to 1 week. The first reaction may also advantageously be catalyzed by metallic chlorides such as aluminum trichloride, titanium tetrachloride and stannic chloride.

The above described processes may be combined so as to result in a mixture of phosphorous esters according to Formula I.

The triisopropylphenol which is employed for the synthesis of the Formula I compounds can be obtained, for example, by condensing phenol with an excess of propylene under pressure and in the presence of an acid catalyst such as sulfuric acid and phosphoric acid, cation exchange resin, activated clay and gamma alumina. On this subject, one may consult German Pat. 1,142,873 as well as the article by T. Okazaki et al., Koru Taru, 1964, 16 (2) pp. 49–62; Chemical Abstracts 61; 6941b.

The isopropyl substituents can be in the ortho, meta, or para position with respect to the phenol group. The triisopropylphenol can contain up to about 10% of isopropyl ethers of polyisopropylphenol which frequently form at the same time as the isopropylphenols during the condensation of phenol with propylene. It is known, moreover, that heating the isopropyl ethers of phenols in the presence of a strong acid substantially converts them into isomeric isopropylphenols (cf. E. A. Goldsmith et al., Journ. Org. Chem., 1958, 23, 1871–6; Niederl and Natelson, Journ. Am. Chem. Soc., 1931, 53, 1928; Smith, ibid., 1933, 55, 849). In the instant invention, the isopropyl ether of triisopropylphenol is partially converted into tetraisopropylphenol during the reaction with PCl₃ under the catalytic action of hydrochloric acid which is liberated by the reaction.

If one desires, however, the isopropyl ethers can be separated by extraction from the crude polyisopropylphenol with hydroalcoholic sodium hydroxide in which the free phenols, but not their ethers, dissolve.

A search to identify all of the reactants which can be employed in the preparation of the phosphorous esters of this invention was not conducted, however, it is understood that reactants not specifically recited herein which result in said phosphorous esters according to the above-described processes are within the spirit and scope of this invention.

The phosphorous esters of Formula I wherein $x$ is 2 or 3 and mixtures of said esters are especially advantageous as disclosed herein.

The phosphites conforming to this invention have application as antioxidants and stabilizers against the effects of heat and ultra-violet radiation and especially as stabilizers for products which at any moment of their manufacture or use must come into contact with water.

The following examples illustrate the preparation of phosphorous esters according to this invention:

EXAMPLE 1

(a) Crude triisopropylphenol having a brown color was obtained by condensing phenol with propylene in the presence of an activated acid clay. The triisopropylphenol was rectified under vacuum and only the middle fraction of the distillate, a yellow or gold liquid, boiling between 130° and 150° under 13–14 mm. Hg representing 95% of the crude product was retained.

Analysis by vapor phase chromatography and mass spectrometry gave the following composition in moles percent: triisopropylphenols (2 isomers), 91.2%; diisopropylphenols (3 isomers), 2.6%; isopropylethers of triisopropylphenols (3 isomers), 5.3%, isopropylethers of diisopropylphenols, trace amounts; and other ethers, probably cyclic structures (chromane or coumarane) of molecular mass 260 (2 isomers), 0.9%.

(b) 641 gm. of previously rectified polyisopropylphenol was charged into a two liter reactor equipped with a stirrer, thermometer, bubble tube, reflux condensor and dropping funnel. 110 gm. of PCl₃ were then added. The reactor was heated and hydrochloric acid began to be evolved at about 55° C. The temperature was maintained for 1 hour at 55° to 70° C. and over the next 5 hours it was increased to 210° C., this temperature being maintained for 18 hours during which dry nitrogen was bubbled into the liquid. The reaction then continued to take place for another 14 hours at 240° C. The total conversion of PCl₃ was calculated from the percentage of residual combined chlorine taken at different stages of the reaction.

| Total heating time at— | | | | | |
|---|---|---|---|---|---|
| 210° | 2½ hrs. | 10½ hrs. | 18 hrs. | 18 hrs. | 18 hrs. |
| 240° | | | | 5 hrs. | 14 hrs. |
| Total conversion of PCl₃, percent | 80.5 | 88 | 91 | 94.7 | 98.3 |

The end product was separated from excess polyisopropylphenols by distillation under 15 mm. Hg and at a final temperature for the residue of 215° C. The remaining phosphite weighing 530 gm. and containing 0.29% combined chlorine was added at 75° C. to 4.8 gm. of epichlorohydrin and maintained at this temperature for 12 hours after which it was cooled. The end product was a very viscous oil of a pale yellow color clearer than that of the starting polyisopropylphenol and had a refractive index of $n_D{}^{25}=1.5220$.

EXAMPLE 2

In the same manner as described in Example 1, 125 gm. of the polyisopropylphenol recovered according to procedure 1(b), 397 gm. of polyisopropylphenols rectified according to procedure 1(a) and 91.5 gm. (0.67 mole)

of $PCl_3$ were reacted. The temperature remained a constant 70° C. for two hours to be followed by an increase over two hours to 240° C. The latter temperature was maintained for 19 hours while nitrogen was being bubbled into the reaction mixture. At the conclusion of this period, the excess polyisopropylphenol was distilled under vacuum. The residue weighed 451 gm. and titrated 1.08% combined chlorine (or a total conversion of $PCl_3$ of 93%). 21.5 gm. of bisphenol A was added to the residue and the solution was heated to 240° C. for 7 hours thus resulting in a phosphite containing only 0.29% combined chlorine. The phosphite was a viscous oil with a refractive index of $n_D^{25}=1.5245$.

EXAMPLE 3

In the same manner as described in Example 1(b), 344 gm. of $PCl_3$ and 1762 gm. of the rectified polyisopropylphenol of Example 1(a) were reacted. The temperature increased from 25° C. to 200° over 1½ hours and was maintained at 200–210° C. for two hours while nitrogen was being bubbled into the reaction medium. The intermediate product contained 3.75% of combined chlorine at this stage. The uncombined polyisopropylphenol was removed under vacuum whereby 579 gm. were recovered, and 300 gm. of bisphenol A were added to the recovered product. The reaction proceeded at 210°–215° for 7 hours at atmospheric pressure. The phosphite which was thus obtained contained only 0.36% combined chlorine and was a clear yellow liquid having a refractive index of $n_D^{25}=1.537$.

EXAMPLE 4

The procedure of Example 3 was repeated except that bisphenol A was replaced with 575 gm. of mononylphenol. The phosphite which was recovered titrated 0.31% combined chlorine and was a viscous though free-flowing oil having a refractive index of $$n_D^{25}=1.5215$$

EXAMPLE 5

The procedure described in Example 1(b) was repeated using a freshly rectified polyisopropylphenol with the following molar composition: triisopropylphenols, 90.1% (which decomposed into a light isomer, 75.6% and a heavy isomer, 14.5%); diisopropylphenols, 8.5% (4.5% of which was a light isomer, 2.2% a medium isomer and 1.8% a heavy isomer); and ethers, 1.4%, 1,643 kg. of the above polyisopropylphenol was charged into a glass lined reactor along with 320 kg. of $PCl_3$. The temperature gradually increased over a period of 9½ hours from 23° C. to 200° C. and the latter temperature was maintained for 18 hours while bubbling dry nitrogen into the reaction medium after which the excess polyisopropylphenol was removed by distillation at 13 mm. Hg to a final temperature for the residue of 205° C.

The polyisopropylphenol thus recovered weighed 236 kg. and corresponded to the following molar composition: triisopropylphenols, 82.3% (containing a light isomer, 80.8%, and a heavy isomer, 1.5%); diisopropylphenols, 11.5% (containing 9.7% light isomer, 1.4% middle isomer and 0.4% heavy isomer); and ethers, 7.7%.

The ester recovered from the free polyisopropylphenol weighed 1485 kg. and contained 1.24% combined chlorine which corresponded to a total transformation of $PCl_3$ of 92.5%. The phosphite was added at 90° C. to 40 kg. of epichlorohydrin and maintained at this temperature for 12 hours. The end product was a pale yellow oil having a refractive index $$n_D^{25}=1.5215$$

and a viscosity at 50° C.=1,200 centistokes.

EXAMPLE 6

775 gm. of triphenylphosphite and 1762 gm. of polyisopropylphenol rectified according to Example 1(a) were charged into a ground flask equipped with a Vigreux column. The reaction medium was heated for four hours at 200° C. at the atmospheric pressure then at 155°–158° C. under 15 mm. Hg seeing to it that the temperature of the vapor at the top of the column did not exceed 90° C. 453.5 gm. of phenol were thus distilled which crystallized in the receiving flask which was cooled by a stream of water. The Vigreux column was then removed and the excess polyisopropylphenol was distilled thus resulting in a recovery of 687 gm. The remaining phosphite weighed 1,368 gm. and was a pale yellow oil slightly viscous, having a refractive index of $n_D^{25}=1.5360$ and the approximate composition of a bis(polyisopropylphenyl) mono-phenyl phosphite.

EXAMPLE 7

547 gm. of the phosphite obtained in Example 6 (approximately 1 mole), 270 gm. of stearyl alcohol (1 mole) and 1.25 gm. of KOH were charged into a flask equipped with a Vigreux column. The reaction medium was heated under a vacuum of 15 mm. Hg for 4 hours at 200° C. 103 gm. of a partially crystallized distillate containing 93% phenol were recovered. The murky phosphite residue was filtered while hot thereby yielding a slightly colored oil having a refractive index of $$n_D^{35}=1.4955$$

which solidified upon cooling into a crystalline mass having a melting point measured with the aid of a microscope equipped with a heated stage of from 30° to 33° C.

The structure of this product was approximately that of bis(polyisopropylphenyl) monostearyl phosphite.

MEASUREMENT OF HYDROLYSIS STABILITY

In order to evaluate the resistance to hydrolysis of various phosphorous esters, both those which are known and those conforming to this invention, a number of experiments were carried out according to the following procedure. 5 gm. of the phosphite to be tested were weighed to within 0.1 mg. within a ground 250 ml. flask. 100 ml. of distilled water measured from a pipette and several glass beads were added to the flask. A condensor was fitted to the flask and the temperature of the reaction medium was increased to the boiling point of the mixture as rapidly as possibly by means of a Bunsen burner. When the liquid started to boil, a timer was started. At the desired interval, the flask was rapidly cooled and 10 ml. of the solution was withdrawn by pipette. This test sample was diluted with about 50 ml. distilled water and titrated with a decinormal solution of aqueous NaOH until the bromo-phenol blue indicator turned blue.

Total hydrolysis was arbitrarily defined as the ratio $100x/y$, $x$ being the actual volume of decinormal NaOH consumed and $y$ being the theoretical volume of this reactant calculated upon the hypothesis of a total hydrolysis of phosphite to phosphorous acid.

It is to be noted that this test provides only an approximate means for measuring hydrolysis stability because it disregards the acidity which is present in the organic phase, that is to say, the acidity of the monoalkyl or monoaryl phosphites, when the latter are poorly hydrosoluble; the test thus favors the phosphites of high molecular weight.

The results set forth in Table I clearly show the resistance to hydrolysis of the groups

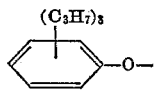

It is also seen from the results in Table I that the introduction of heavy alkyl radicals into the phosphite in all cases increases the stability of the phosphites to hydrolysis.

TABLE I.—PERCENT HYDROLYSIS OF VARIOUS PHOSPHOROUS ESTERS

| Phosphorous esters | Duration of boiling | | |
|---|---|---|---|
| | 20 min. | 80 min. | 140 min |
| Triphenyl phosphite | 100 | | |
| Trixylyl phosphite | 99 | 100 | |
| Tris(mononoylphenyl)phosphite | 66 | 97 | |
| Polygard HR (containing 1% triisopropanolamine) | 45 | 85 | |
| Polygard | 60 | 87 | |
| Bis(polyisopropylphenyl)monophenyl phosphite (Ex. 6) | 55 | 85 | 92 |
| Nonylphenyl polyisopropylphenyl phosphite (Ex. 4) | 24 | 79 | 92 |
| Isopropylidene diphenyl polyisopropylphenyl phosphite (Ex. 3) | 35 | 80 | |
| Polyisopropylphenyl dichloropropyl phosphite (Ex. 5) | 37 | 80 | |
| Mixture of polyisopropylphenyl dichloropropyl phosphite with 1% triisopropanolamine | 29 | 75 | |
| Diphenyl isodecyl phosphite | | 71 | |
| Phenyl diisodecyl phosphite | | 50 | |
| Triisodecyl phosphite | | 31 | |
| Tristearyl phosphite | | 29 | |
| Monostearyl bis(polyisopropylphenyl) phosphite (Ex. 7) | 0 | 59 | 76.5 |

I claim:

1. Hydrolysis-stable phosphorous esters corresponding to the general formula

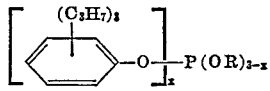

wherein the group $C_3H_7$ is an isopropyl radical, $x$ is the integer 1, 2 or 3 and R is an aryl or alkaryl radical containing from 6 to about 30 carbon atoms or an aliphatic, cycloaliphatic or aryl-aliphatic radical containing from 2 to about 30 carbon atoms and from 0 to 2 chlorine atoms, 0 or 1 bromine atom and 0 to 6 oxygen atoms.

2. The phosphorous esters of claim 1 wherein R is a phenyl, cresyl, xylenyl, isopropylphenyl, triisopropylphenyl, octylphenyl, nonylphenyl, dinonylphenyl or dodecylphenyl radical.

3. The phosphorous esters of claim 1 wherein R is a monovalent residue of a polyphenol radical.

4. The phosphorous esters of claim 3 wherein the polyphenol residue is a resorcinol, hydroquinone, 1,5-naphthalene diol, bisphenol A or p,p' diphenol residue.

5. The phosphorous esters of claim 1 wherein R is an isooctyl, isodecyl, stearyl, benzyl, methyl tri (oxyethyl), 1-ethyl-2-chloro, 1-propyl-2-chloro, 1,3-dichloro-2-propyl or 2-chlorocyclohexyl radical.

6. The phosphorous esters of claim 1 wherein R is a monovalent residue of a polyalcohol.

7. The phosphorous esters of claim 6 wherein the polyalcohol residue is an ethyleneglycol, diethyleneglycol, triethylene glycol, 1,3-propane diol or 1,4-butane diol residue.

8. The phosphorous esters of claim 1 containing less than about 5% by weight of one or several amines having boiling points above about 150° C.

9. The phosphorous esters of claim 8 wherein the amine is triethanolamine, triisopropanolamine, diethanolamine, diisopropanolamine, tetraisopropanolethylenediamine, aniline, α-naphthylamine or o-, m- or p-phenylenediamine.

10. The phosphorous esters of claim 1 wherein $x$ is 2 or 3.

References Cited
UNITED STATES PATENTS

| | | | |
|---|---|---|---|
| 2,220,113 | 11/1940 | Moyle | 260—967 |
| 2,968,670 | 1/1961 | Boyer et al. | 260—967 X |
| 3,329,742 | 7/1967 | Myers | 260—967 X |
| 3,412,064 | 11/1968 | Brindell | 260—967 X |
| 3,415,907 | 12/1968 | Sconce et al. | 260—967 |
| 3,558,554 | 1/1971 | Kuriyama et al. | 260—967 X |

LEWIS GOTTS, Primary Examiner

R. L. RAYMOND, Assistant Examiner

U.S. Cl. X.R.

260—45.7 P, 976, 977, 982, 989

UNITED STATES PATENT OFFICE
CERTIFICATE OF CORRECTION

Patent No. 3,787,537                     Dated January 22, 1974

Inventor(s) Michael De Marco

It is certified that error appears in the above-identified patent and that said Letters Patent are hereby corrected as shown below:

Column 2, line 55, "is in" should read -- is an --.

Column 3, line 34, "$R^2$ and $R^4$" should read -- $R^3$ and $R^4$ --.

Column 6, line 28, "130°" should read -- 139° --.

Column 8, line 45, "possibly" should read -- possible --.

Signed and sealed this 21st day of May 1974.

(SEAL)
Attest:

EDWARD M. FLETCHER, JR.                C. MARSHALL DANN
Attesting Officer                      Commissioner of Patents

UNITED STATES PATENT OFFICE
CERTIFICATE OF CORRECTION

Patent No. 3,787,537                Dated January 22, 1974

Inventor(s) Michel Demarcq

It is certified that error appears in the above-identified patent and that said Letters Patent are hereby corrected as shown below:

the inventor's name "Michel De Marcq" should be

--Michel Demarcq-- in the title of invention "phosphates" should be

--phosphites--.

Signed and sealed this 21st day of January 1975.

(SEAL)
Attest:

McCOY M. GIBSON JR.             C. MARSHALL DANN
Attesting Officer               Commissioner of Patents

UNITED STATES PATENT OFFICE
CERTIFICATE OF CORRECTION

Patent No. 3,787,537     Dated January 22, 1974

Inventor(s) Michel Demarcq

It is certified that error appears in the above-identified patent and that said Letters Patent are hereby corrected as shown below:

Column 1, line 5,

Claim to Priority date reads  "July 5, 1970"

should read  --July 17, 1970--

Signed and sealed this 15th day of July 1975.

(SEAL)
Attest:

RUTH C. MASON
Attesting Officer

C. MARSHALL DANN
Commissioner of Patents
and Trademarks